Sept. 10, 1929.   B. C. ROOT   1,727,413
ANGULAR CONDUIT CONNECTION AND METHOD OF MAKING SAME
Filed June 7, 1926
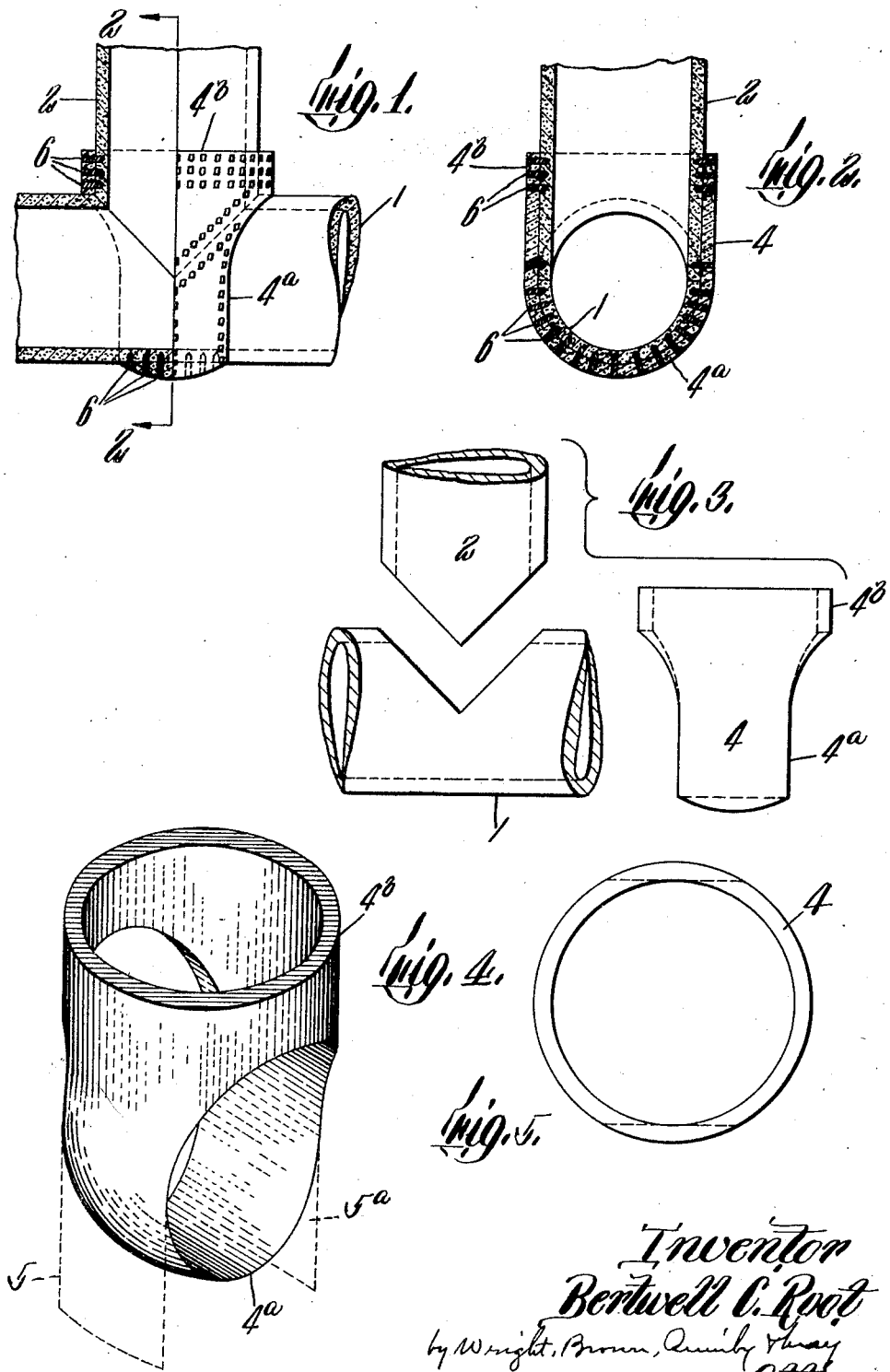

Patented Sept. 10, 1929.

1,727,413

UNITED STATES PATENT OFFICE.

BERTWELL C. ROOT, OF BERLIN, NEW HAMPSHIRE, ASSIGNOR TO BROWN COMPANY, OF BERLIN, NEW HAMPSHIRE, A CORPORATION OF MAINE.

ANGULAR CONDUIT CONNECTION AND METHOD OF MAKING SAME.

Application filed June 7, 1926. Serial No. 114,268.

This invention has relation to angular conduit connections and to a method of making the same, and more specifically has relation to angular connections between conduits made of fibrous material saturated with a thermoplastic waterproofing compound. Among other uses, such conduits find extensive application as fluid conductors and as housings for electric cables or wires.

A fibrous conduit or tube such as herein contemplated may be made by winding a web of cellulose pulp (e. g., chemical, mechanical, or mixed pulp) from a Fourdrinier wire or other web-forming mechanism, on a mandrel, until a tubular wall of the desired thickness has been built up, whereupon the conduit is stripped from the mandrel and is thoroughly dried. The individual convolutions or layers of the wall of a conduit thus formed are sufficiently matted together or interfelted to result in a substantially homogeneous, non-laminated structure. The dry conduit is then treated with a thermoplastic waterproofing compound, e. g., pitch, in a manner to permeate or saturate the same, thereby rendering it water-resistant, also strengthening and rigidifying the same, and increasing its dielectric properties.

In practice, it is frequently necessary to connect one conduit at an angle with another conduit, as in the form of a T. This invention provides a simple and efficient method of making an angular conduit connection which is durable and well-appearing and which is made with fibrous conduit material so utilized as to constitute in effect an integral construction.

In accordance with the method of this invention, the conduits are angularly connected before being subjected to a waterproofing treatment. A suitable opening is first cut into the wall of the main conduit or cross-member of the T, and the end of the branch or conduit to be angularly connected thereto is cut to fit the cut wall. A yoke for holding the branch in place is then assembled with the branch and the main conduit, after which the parts are secured in place and are treated with the waterproofing compound.

The invention may best be understood from the following more detailed description thereof when considered in conjunction with the accompanying drawings, wherein Figure 1 represents in front elevation an angular connection formed by the method of the present invention.

Figure 2 is a section on the line 2—2 of Figure 1.

Figure 3 represents a front elevation of the several parts of the connection, ready for assembly.

Figure 4 illustrates in perspective a member for holding the branch in place, the dotted line indicating the outline of a yoke from which it is formed.

Figure 5 is a plan view of the member.

Referring to the drawings, at 1 is shown the portion of a main conduit from which it is desired to lead off angularly a branch conduit 2. The conduit 1 is cut to form an opening of the desired form for the reception of the conduit 2. As herein shown, the cut is in the form of a V, symmetrically disposed transversely of the main conduit and serving for a rectangular lead-off. An end of the conduit 2 is cut in the form of a V, complemental with the V cut in the wall of the conduit 1. Preferably, the contacting surfaces of the conduits are treated with an adhesive, such as glue, to hold them temporarily together when they have been assembled.

The conduits are maintained in assembled relation by a yoke 4, comprising a ring portion 4ª which engages about the conduit 1, and a collar 4ᵇ protruding therefrom, which serves as a socket for the reception of the conduit 2. As shown in Figure 4, the yoke 4 is formed from a conduit section cut to the form of a forked collar 5, shown in dotted outline. The forked collar comprises the collar portion 4ᵇ, from which project the elements 5ª, spaced opposite to one another a sufficient distance to take over the conduit 1, the portions of the elements adjacent to the collar 4ᵇ being cut to a curvature to fit nicely over the conduit 1.

In forming the yoke 4, the elements 5ª are first soaked or wetted with water until their fibrous structure has been penetrated and reduced to a sufficiently pulpous condition to undergo formation without breakage. With the conduit 2 temporarily fixed in position, the collar 4ᵇ is inserted over the conduit 2 and slipped down into place, with the elements 5ᵃ embracing the conduit 1. These elements are then wrapped tightly about the conduit 1, the end portion of one element overlapping the end portion of the other to form the ring 4ᵃ, whereupon, if desired, they may be temporarily tied together by strings or wires, until the ring portion has dried or set and the elements have interfelted or become matted together, after which the tying means may be removed.

In place of forming the forked collar 5 from a dry tube, however, it may be more expedient to form it from a "green" tube, i. e., from a tube which has been removed from the machine before it has been dried. The yoke 4 may then be formed directly therefrom. Furthermore, in place of forming the yoke 4 about the temporarily fixed conduits, it may be moulded independently from the forked collar 5 on a mandrel of a size corresponding to the size of the conduit 1 to the form shown in Figure 3, and the ring portion 4ᵃ slipped in place over the conduit 1 so that the conduit 2 may then be inserted into the collar 4 to engage in the V opening cut in the conduit 1.

After assembly, the pieces are permanently fastened together, preferably by wooden pegs. As shown in Figure 1, pegs 6 arranged in rows are driven through the collar 4 into the conduit 2 and through the ring portion 4ᵃ into the conduit 1. The pegs may be similar to those commonly employed in pegging shoes. The yoke 4 thus serves to hold the conduit securely together, which after fastening are not liable to become loosened from one another, even when a considerable force is applied thereto. To facilitate pegging, apertures of shorter length than the pegs may be made through the member and in the conduit, after which the pegs may be inserted into the apertures and driven into the unperforated material. If desired, however, a shoe-pegging machine, which both forms the apertures and drives the pegs into the material, may be employed.

The assembled and fastened parts are then treated with a thermoplastic waterproofing material, e. g., pitch, in a manner to effect a saturation of the fibrous material. This treatment further results in an intimate bonding of the parts and the resultant joint is solid, well-appearing, and is not liable to breakage or leakage.

While I have described this invention as embodied in a T connection, it should be understood that this is illustrative only and that connections of other angularity may be similarly formed. Furthermore, it should be understood that the invention is susceptible of various changes and modifications without departing from its spirit or scope as defined by the appended claims.

I do not herein claim broadly a method of joining fibrous conduits or conduit parts, which comprises pegging the conduits or conduit parts together and then saturating the same with waterproofing material, as this is disclosed and claimed in my application, Serial No. 108,673, filed May 12, 1926.

What I claim is:

1. A non-leaking connection between tubular fibrous conduits, one of said conduits having an opening in its wall in which another conduit is angularly fitted, comprising a fibrous member engaging and pegged to both said conduits.

2. A non-leaking tubular fibrous conduit joint, comprising a conduit having an opening in its wall, a conduit angularly fitted in said opening, and a fibrous member engaging and pegged to both said conduits, said joint being saturated with a thermoplastic waterproofing compound which also serves to bond the parts together.

3. A non-leaking connection between tubular fibrous conduits, one of said conduits communicating angularly with the other conduit, including a fibrous yoke comprising a ring engaging about one conduit and a collar in which said angular conduit is fitted, and pegs fastening the yoke to both said conduits, the entire connection being saturated with waterproofing compound, which also serves to bond together the parts.

4. A method of angularly connecting tubular fibrous conduits, which comprises forming an opening in the wall of one conduit, fitting and inserting the end of the other conduit angularly in said opening, slipping a forked fibrous collar over said angular conduit, wrapping the forks projecting from said collar about the wall of said first-mentioned conduit, pegging the collar to both said conduits, and saturating the entire connection with a thermoplastic waterproofing compound.

In testimony whereof I have affixed my signature.

BERTWELL C. ROOT.